US011588225B2

(12) United States Patent
Rossman et al.

(10) Patent No.: US 11,588,225 B2
(45) Date of Patent: Feb. 21, 2023

(54) LOW PROFILE ANTENNA

(71) Applicant: BAE Systems Information and Electronic Systems Integration Inc., Nashua, NH (US)

(72) Inventors: Court E. Rossman, Merrimack, NH (US); Arturs E. Dinbergs, Hollis, NH (US); Jonothan S. Jensen, Nashua, NH (US); Anna Lebedeva, Nashua, NH (US); Timothy J. McLinden, Nashua, NH (US); Clint H. Perry, Londonderry, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 84 days.

(21) Appl. No.: 17/070,512

(22) Filed: Oct. 14, 2020

(65) Prior Publication Data
US 2022/0115775 A1 Apr. 14, 2022

(51) Int. Cl.
*H01Q 1/36* (2006.01)
*H01Q 1/28* (2006.01)
(Continued)

(52) U.S. Cl.
CPC ............... *H01Q 1/28* (2013.01); *B64C 1/36* (2013.01); *H01Q 1/48* (2013.01); *H01Q 7/00* (2013.01); *H04B 1/02* (2013.01)

(58) Field of Classification Search
CPC ............... H01Q 1/28; H01Q 1/48; H01Q 1/36
See application file for complete search history.

(56) References Cited

U.S. PATENT DOCUMENTS

| 3,624,658 | A | 11/1971 | Voronoff |
| 3,828,351 | A | 8/1974 | Voronoff |

(Continued)

FOREIGN PATENT DOCUMENTS

| CN | 103943954 A | 7/2014 |
| EP | 1061605 | 10/2004 |

OTHER PUBLICATIONS

International Search Report, PCT/US21/54517, dated Jan. 11, 2022, 8 pages.

*Primary Examiner* — Hasan Islam
(74) *Attorney, Agent, or Firm* — Finch & Maloney PLLC; Gary McFaline

(57) ABSTRACT

Techniques are provided for fabricating a low profile antenna that operates with increased efficiency. An antenna implementing the techniques according to an embodiment includes a first arm comprising a first spiral portion and a first rectilinear portion, and a second arm comprising a second spiral portion and a second rectilinear portion. The second spiral portion is concentric with the first spiral portion. The antenna further includes an insulator to separate the arms. The insulator and the arms are planar surfaces disposed within a rectangular region. The first rectilinear portion is adjacent to a first and second side of the perimeter of the rectangular region, and the second rectilinear portion is adjacent to a third and fourth side of the perimeter of the region. The antenna is fabricated as a printed circuit board which is mounted on the fuselage of an aircraft, which serves as a ground plane for the antenna.

9 Claims, 6 Drawing Sheets

(51) Int. Cl.
  *H01Q 7/00* (2006.01)
  *B64C 1/36* (2006.01)
  *H01Q 1/48* (2006.01)
  *H04B 1/02* (2006.01)

(56) References Cited

U.S. PATENT DOCUMENTS

| | | | |
|---|---|---|---|
| 3,969,732 | A | 7/1976 | Holloway |
| 4,525,720 | A | 6/1985 | Corzine et al. |
| 5,621,422 | A | 4/1997 | Wang |
| 6,211,839 | B1 * | 4/2001 | Campbell ............... H01Q 1/38 343/792.5 |
| 6,853,351 | B1 | 2/2005 | Mohuchy |
| 7,460,083 | B2 | 12/2008 | Parsche et al. |
| 8,390,529 | B1 | 3/2013 | Paulsen et al. |
| 8,847,846 | B1 | 9/2014 | Diaz |
| 10,665,961 | B1 | 5/2020 | McMahon et al. |
| 10,950,927 | B1 * | 3/2021 | West ............... H01Q 1/364 |
| 2004/0027308 | A1 * | 2/2004 | Lynch ............... H01Q 21/28 343/895 |
| 2010/0271267 | A1 * | 10/2010 | Roth ............... H01Q 13/106 343/700 MS |
| 2012/0229363 | A1 * | 9/2012 | Webb ............... H01Q 13/106 343/895 |
| 2014/0132479 | A1 * | 5/2014 | Yemelong ............... H01Q 1/36 343/895 |
| 2014/0354500 | A1 | 12/2014 | Tayama et al. |
| 2018/0062250 | A1 | 3/2018 | Lavin et al. |
| 2018/0212318 | A1 | 7/2018 | Salanis et al. |
| 2020/0091608 | A1 | 3/2020 | Alpman et al. |

\* cited by examiner

LOW PROFILE ANTENNA

INCORPORATION BY REFERENCE

U.S. application Ser. No. 16/438,889, filed Jun. 12, 2019, is incorporated herein by reference in its entirety.

FIELD OF DISCLOSURE

The present disclosure relates to antennas, and more particularly, to a low profile and high efficiency antenna that can be deployed on the fuselage of an aircraft or other aerodynamic body.

BACKGROUND

Generally, antennas can take many physical forms, but not all of these physical forms are suitable for a given application. For example, aircraft applications may impose more restrictive operational requirements on an antenna design. Similar design constraints would also apply to applications requiring a platform which supports a given antenna to have a high degree of aerodynamic performance. Numerous such applications will be appreciated in light of this disclosure.

Figure 1:
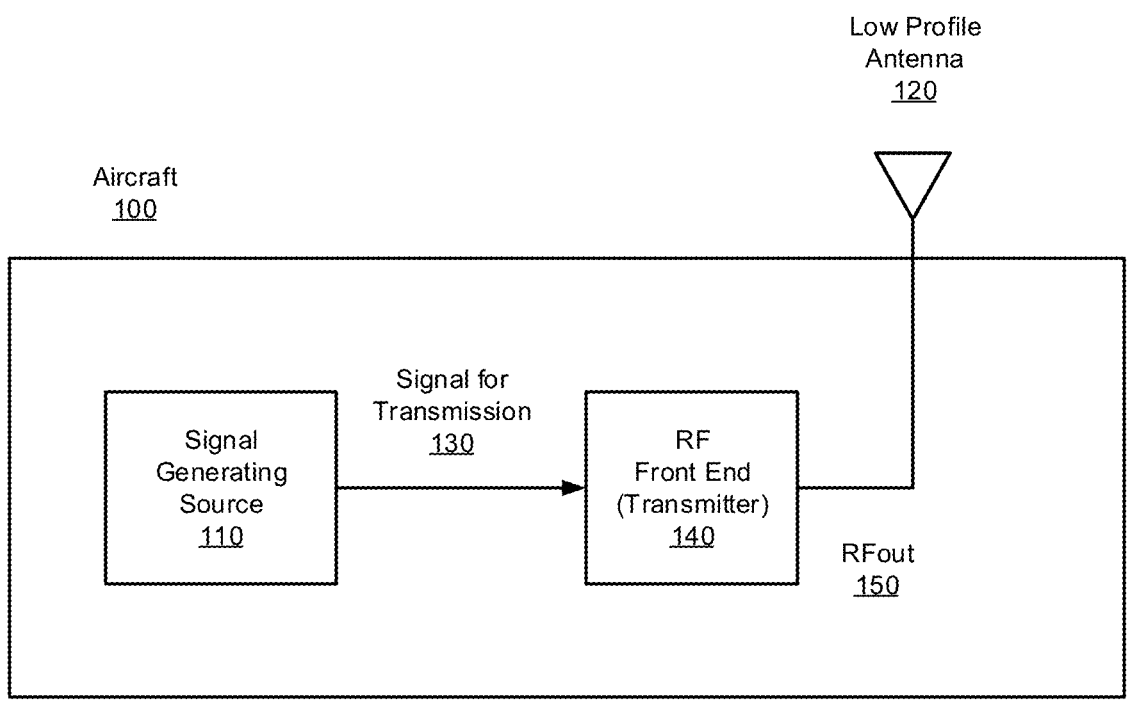
FIG. 1 illustrates an aircraft, or other aerodynamic or relatively smooth-surfaced body, configured with a low profile antenna, in accordance with an embodiment of the present disclosure.

Although the following Detailed Description will proceed with reference being made to illustrative embodiments, many alternatives, modifications, and variations thereof will be apparent to those skilled in the art.

DETAILED DESCRIPTION

As previously noted, antennas can be designed and fabricated to take many physical forms, but not all of these forms are suitable for any given application. In particular, applications requiring a relatively high degree of aerodynamic performance, such as aircraft and guided munition applications typically impose more restrictive operational requirements on the design of antennas that are to be deployed on the outer surface of the given or other aerodynamic platform which hosts the antenna, whether it be the fuselage of the aircraft or the cylindrical housing of a guided projectile, or some other aerodynamic body. For example, size and weight may be limited, and the antenna may be required to have a relatively low profile, or protrusion from the surface, for aerodynamic reasons. Unfortunately, however, smaller antennas generally have lower gain and reduced efficiency.

To this end, techniques are herein disclosed for the design and fabrication of a low profile antenna that can provide increased gain and efficiency while utilizing a reduced surface area. According to an embodiment, a dual-armed spiral antenna is provided in which the two arms each transition from a spiral geometry to a rectilinear geometry that traces the perimeter of the allowable antenna surface area. This geometric pattern increases antenna efficiency by more fully utilizing the surface area (and volume) that is available for the antenna on the given platform (e.g., any aerodynamic body, or a body having need for a relatively smooth outer surface).

The disclosed techniques can be used in a wide variety of applications including, for example, aircraft (manned and unmanned), guided munitions and projectiles (lethal and non-lethal), space-based systems, communication systems, radars, and electronic warfare systems, although other applications will be apparent. In accordance with an embodiment, an antenna includes a first arm comprising a first spiral portion and a first rectilinear portion, and a second arm comprising a second spiral portion and a second rectilinear portion. The second spiral portion is concentric with the first spiral portion, such that the first and second spiral portions spiral together and adjacent to one another in an interleaved non-overlapping fashion. The antenna further includes an insulator to separate the arms. The insulator and the arms are planar surfaces disposed within a rectangular region. The first rectilinear portion is adjacent to first and second sides of the perimeter of the rectangular region, and the second rectilinear portion is adjacent to third and fourth sides of the perimeter of the region. The antenna may be fabricated, for example, as a printed circuit board and/or laminate structure which can be mounted on or otherwise integrated with, for instance, the fuselage of an aircraft or the aerodynamic body of the given host platform. The fuselage or other body may serve as the ground plane for the antenna.

It will be appreciated that the techniques described herein may provide improved antenna efficiency, compared to other geometric layouts that do not fully utilize the available volume. Numerous embodiments and applications will be apparent in light of this disclosure.

Architecture

FIG. 1 illustrates an aircraft 100 or other aerodynamic body configured with a low profile antenna 120, in accordance with an embodiment of the present disclosure. For purposes of this example embodiment and others provided herein, the host platform may be referred to as an aircraft, but any number of other host platforms can be used (e.g., projectiles, low-drag platforms, ground vehicles, water vehicles, or any host platform requiring aerodynamic performance or even more simply a relatively flush or otherwise relatively smooth outer surface regardless of any improvement in aerodynamic performance), as will be appreciated in light of this disclosure. The aircraft 100 is shown to include a signal generating source 110, a radio frequency (RF) front end 140 (also referred to herein simply as the transmitter), and the low profile antenna 120. The signal generating source 110 is configured to provide signals for transmission 130 to the RF front end 140. RF front end 140 is configured to convert those signals to the RF frequency range, as RF out 150, for broadcast through the low profile antenna 120. Although the low profile antenna 120 is shown here in a transmission configuration, in some embodiments, the low profile antenna 120 may be employed to receive RF signals, or for both transmitting and receiving. Note that principles of reciprocity may apply in some applications where the antenna 120 is used for both transmit and receive operations, as will be appreciated.

Figure 2:
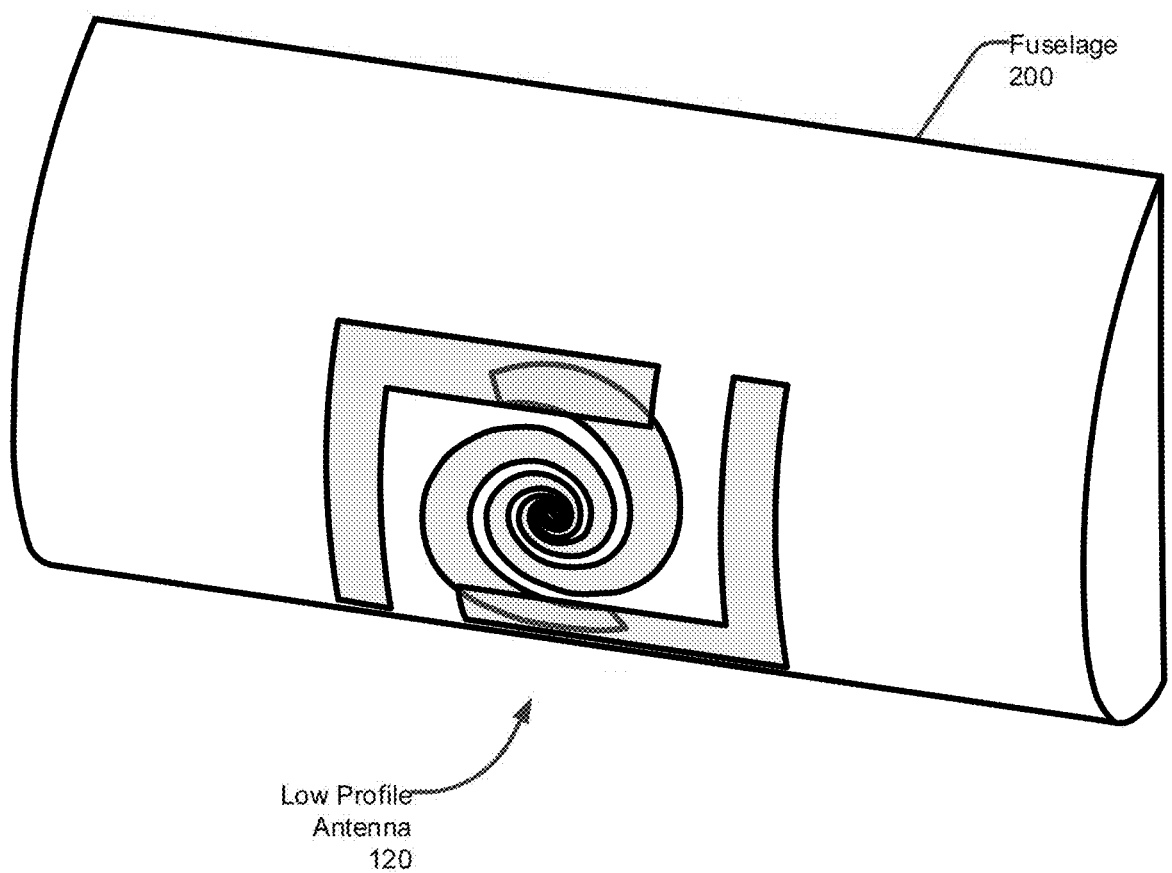
FIG. 2 illustrates the low profile antenna of FIG. 1 disposed on an aircraft fuselage, in accordance with an embodiment of the present disclosure.

FIG. 2 illustrates the low profile antenna 120 on an aircraft fuselage 200, in accordance with an embodiment of the present disclosure. The low profile antenna 120 may be fabricated as a substantially planar structure, for example on a printed circuit board. In some embodiments, the printed circuit board may be slightly curved or otherwise flexible to enable mounting of the antenna on the fuselage 200 of the aircraft 100, at any desired location, as shown.

Figure 3:
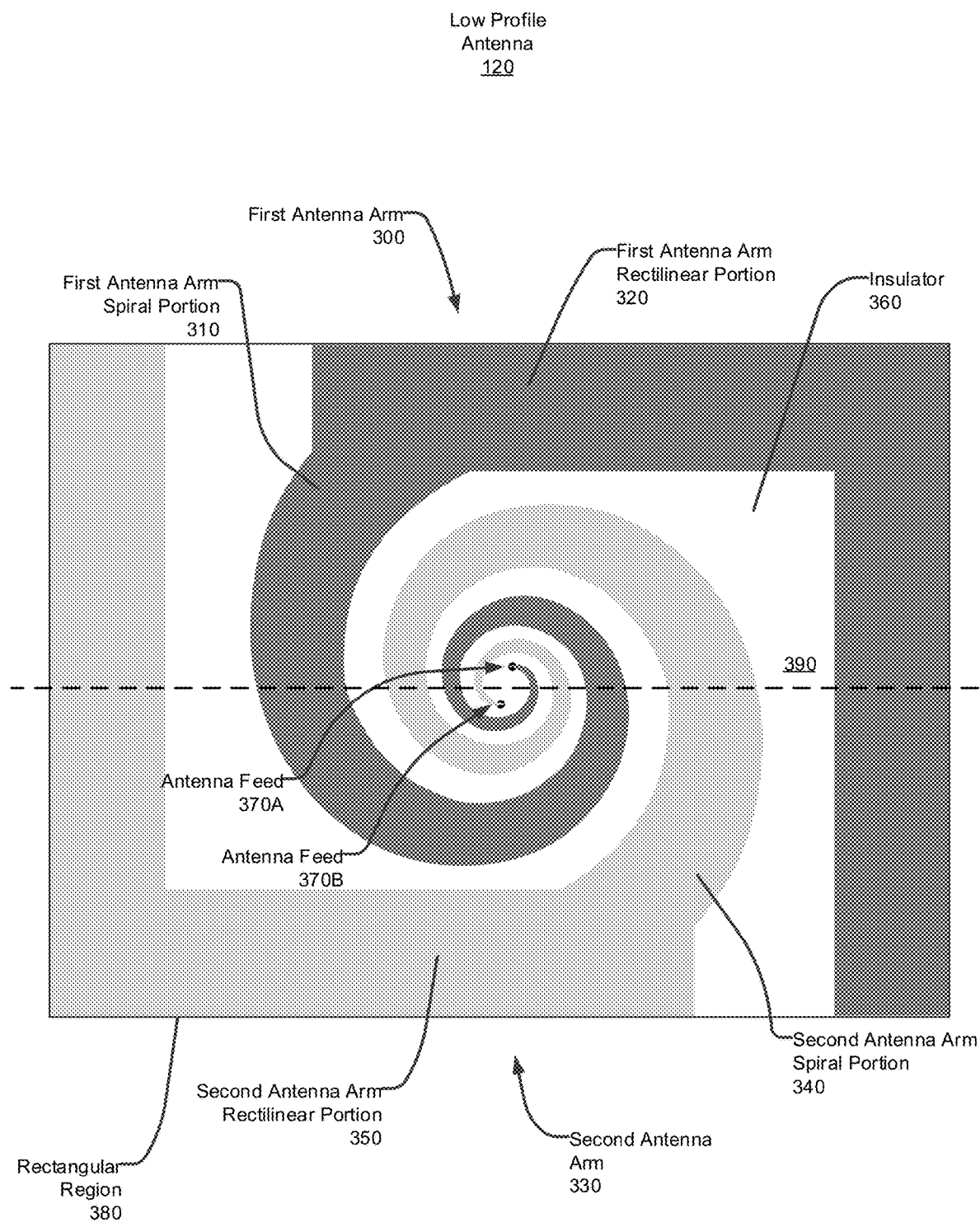
FIG. 3 is a planar view of components of the low profile antenna of FIG. 2, configured in accordance with an embodiment of the present disclosure.

FIG. 3 is a planar view of components of the low profile antenna 120, configured in accordance with an embodiment of the present disclosure. The low profile antenna 120 is shown to include a first antenna arm 300, depicted in a darker gray, and a second antenna arm 330, depicted in a lighter gray. The antenna arms are separated from one another by an insulating region 360. The antenna arms are disposed within a rectangular region 380 which bounds the antenna to a specified maximum allowable area. Note that rectangular region 380 may be square, which is a type of rectangle. A dashed cross section line 390 is indicated in the figure and serves as a reference line for the cross sectional view provided in FIG. 4.

The first antenna arm 300 comprises a first spiral portion 310 which transitions into a first rectilinear portion 320. Likewise, the second antenna arm 330 comprises a second spiral portion 340, which transitions into a second rectilinear portion 350.

The first spiral portion 310 is concentric with the second spiral portion 340, which is to say that the spirals wrap around one another in the plane of the rectangular region and spiral in towards a common central area (although not the same identical spot, such that the arms do not overlap so they remain electrically isolated from one another), as shown in FIG. 3. In fact, each spiral arm terminates in a respective antenna feed, 370A for the first arm and 370B for the second arm, as will be explained below.

The rectilinear portions are L-shaped regions, as shown in FIG. 3, which are disposed adjacent to the interior sides of the perimeter of the rectangular bounding region 380.

In some embodiments, the low profile antenna is fabricated as a printed circuit board and the antenna arms (spiral and rectilinear portions) are composed primarily of copper. For example, the circuit board may include a substrate comprising one or more layers of insulating or otherwise non-conductive materials (e.g., fiber glass, composite material, etc), and the arms 300 and 330 can be formed on a surface of that substrate and may include any conductive material (e.g., copper, aluminum, etc.). Additional conductive and/or insulating layers may be added above and/or below the printed circuit board, depending on the given application. Note that the antenna can be exposed to a desired field of view.

Figure 4:
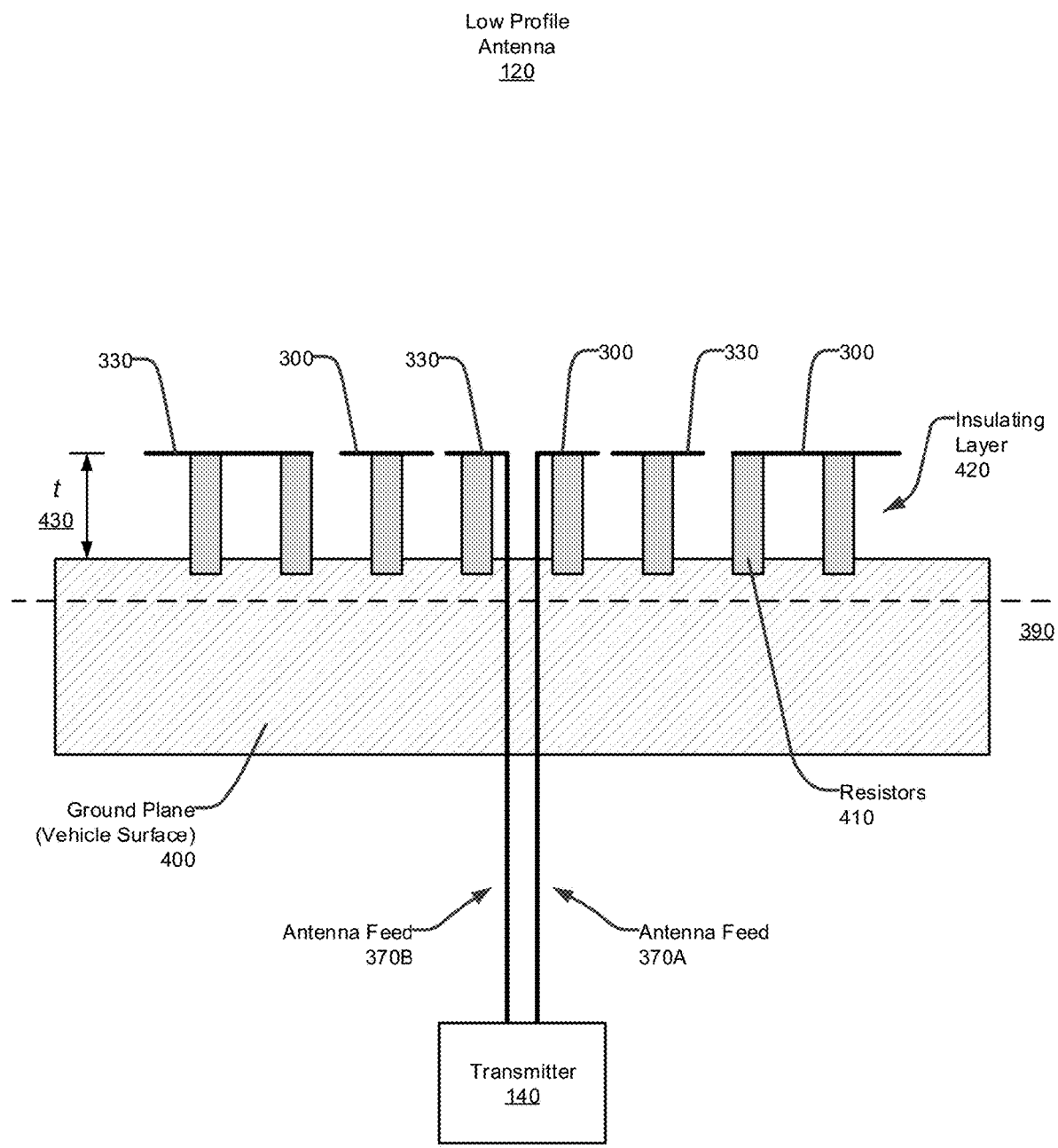
FIG. 4 is a cross sectional view of the components of the low profile antenna of FIG. 2, configured in accordance with an embodiment of the present disclosure.

FIG. 4 is a cross sectional view of the components of the low profile antenna 120, about the reference line 390 of FIG. 3, configured in accordance with an embodiment of the present disclosure. The first and second antenna arms 300, 330 are shown to be overlaid on an insulating layer 420, which in turn is overlaid on a ground plane 400, such that the insulating layer separates the antenna from the ground plane. In some embodiments, the ground plane 400 is the fuselage of the aircraft 100. In some embodiments, the ground plane 400 may be the outer surface of any vehicle or platform upon which the antenna 120 is mounted. In some embodiments, the thickness t 430 of the insulating layer 420 may be relatively small, for example, on the order of two inches, to allow for the antenna to have a low profile, which may be desirable for aerodynamic or other reasons and to comply with requirements imposed by the application.

Resistors 410 are also shown and are provided to electrically couple the first and second antenna arms 300, 330 to the ground plane 400. The resistors are configured to provide a return path for the current flow that is supplied to the antenna from the transmitter 140 through the antenna feeds 370. In some embodiments, the resistors are configured as lumped port resistors. The resistance values may be selected to provide an impedance match between the antenna and the transmitter 140 to reduce electromagnetic reflections and increase transmission efficiency.

The antenna feeds 370 may be located in a channel that penetrates through the insulating layer 420 and the ground plane 400.

Figure 5:
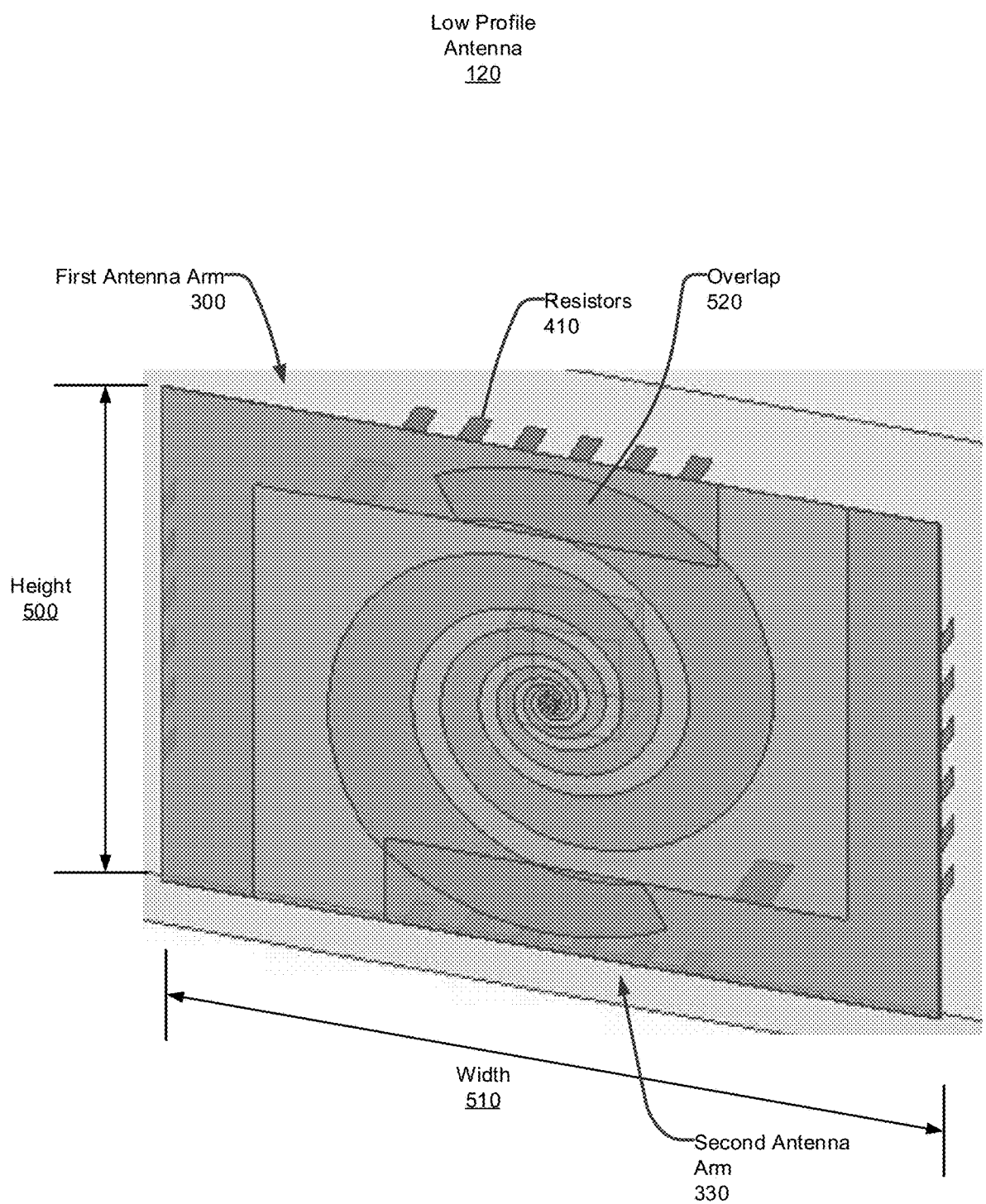
FIG. 5 is a perspective view of the components of the low profile antenna of FIG. 2, configured in accordance with an embodiment of the present disclosure.

FIG. 5 is a perspective view of the components of the low profile antenna 120, configured in accordance with an embodiment of the present disclosure. The first and second antenna arms 300, 330 are shown along with resistors 410 which extend rearward from the antenna arms to the ground plane. The height 500 and width 510 of the overall antenna printed circuit board layout are also indicated in the figure. In some embodiments, the height 500 may be on the order of 30 inches on the width 510 may be on the order of 42 inches, although any suitable dimensions may be chosen, for example based on constraints of the platform such as available space and the need to share space or otherwise coexist with other antennas and/or equipment. The figure also illustrates that the rectilinear portions and the spiral portions of the antenna arms may be fabricated as separate components which overlap 520 and are bonded in any suitable manner that provides an electrical coupling.

In some embodiments, the low profile antenna 120 may provide a voltage standing wave ratio below 3:1 and accept a continuous wave signal of up to 200 Watts. The antenna may also provide greater than 6 dBi of gain over in azimuth range of +/−30 degrees and an elevation range of +2 to −5 degrees. antenna may also provide both horizontal polarization and vertical polarization and operate over a frequency range of 100 MHz to 500 MHz.

Methodology

Figure 6:
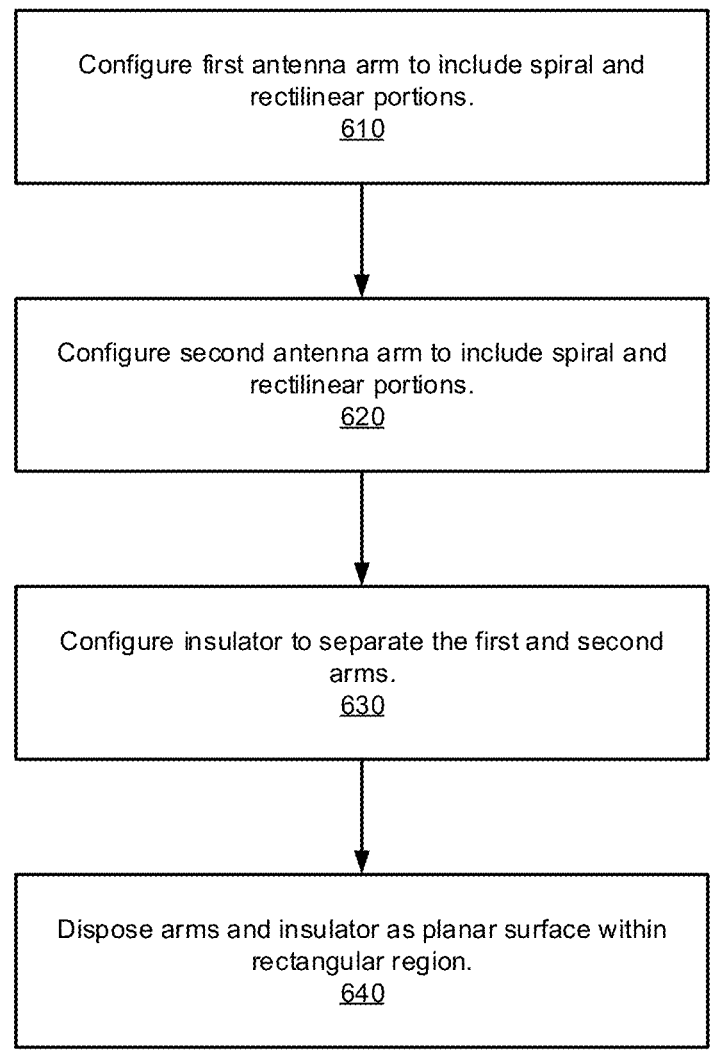
FIG. 6 is a flowchart illustrating a methodology for fabrication of the low profile antenna of FIG. 2, in accordance with an embodiment of the present disclosure.

FIG. 6 is a flowchart illustrating a methodology for fabrication of the low profile antenna 120, in accordance with an embodiment of the present disclosure. As can be seen, example method 600 includes a number of phases and sub-processes, the sequence of which may vary from one embodiment to another. However, when considered in aggregate, these phases and sub-processes form a fabrication process for the low profile antenna, in accordance with certain of the embodiments disclosed herein. These embodiments can be implemented, for example using the system architecture illustrated in FIGS. 1-5, as described above. However other system architectures can be used in other embodiments, as will be apparent in light of this disclosure. To this end, the correlation of the various functions shown in FIG. 6 to the specific components illustrated in FIGS. 1-5 is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 6, in one embodiment method 600 commences, at operation 610, by configuring a first arm of the antenna to include a first spiral portion and a first rectilinear portion.

Next, at operation 620, a second arm of the antenna is configured to include a second spiral portion and a second rectilinear portion. The second spiral portion is concentric with the first spiral portion of the first arm.

At operation 630, an insulator is configured to separate the first arm from the second arm within the plane of the antenna.

At operation 640, the insulator, the first arm, and the second arm are all disposed as planar surfaces within a rectangular region of given dimensions. The first rectilinear portion is positioned adjacent to a first side and a second side of the perimeter of the rectangular region. The second rectilinear portion is positioned adjacent to a third side and a fourth side of the perimeter of the rectangular region. The first side and the second side are adjacent to each other, and the third side in the fourth side are adjacent to each other.

Of course, in some embodiments, additional operations may be performed, as previously described. These additional operations may include, for example, coupling the first arm and the second arm to a ground plane through lumped port resistors, which are configured to provide an impedance match between the antenna and a transmitter that drives the antenna. In some embodiments, the ground plane is the fuselage of an aircraft and an insulating layer is disposed between the ground plane and the first and second antenna arms. In some embodiments, the antenna is fabricated as a printed circuit board in the first and second antenna arms are copper elements of the printed circuit board.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

Unless specifically stated otherwise, it may be appreciated that terms such as "processing," "computing," "calculating," "estimating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides an antenna comprising: a first arm comprising a first spiral portion and a first rectilinear portion; a second arm comprising a second spiral portion and a second rectilinear portion, the second spiral portion concentric with the first spiral portion, such that the first and second spiral portions spiral adjacent to one another in a non-overlapping fashion; and an insulator to separate the first arm from the second arm, wherein the insulator, the first arm, and the second arm are planar surfaces disposed within a rectangular region.

In some cases, the first rectilinear portion is adjacent to a first side and a second side of a perimeter of the rectangular region and the second rectilinear portion is adjacent to a third side and a fourth side of the perimeter of the rectangular region. In some cases, the antenna is mounted on a fuselage of an aircraft. In some cases, the antenna further comprises resistors configured to couple the first arm and the second arm to a ground plane. In some such cases, the ground plane is a fuselage of an aircraft. In some such cases, the antenna further comprises an insulating layer disposed between the ground plane and the first and second arms. In some such cases, the antenna further comprises an antenna feed configured to couple the first and second arms to a transmitter, the antenna feed located in a channel penetrating through the insulating layer and the ground plane. In some such cases, the resistors are configured to provide an impedance match between the antenna and the transmitter. In some cases, the antenna is fabricated as a printed circuit board. In some cases, the first arm and the second arm include copper.

Another example embodiment of the present disclosure provides a method for fabricating an antenna, the method comprising: configuring a first arm of the antenna to include a first spiral portion and a first rectilinear portion; configuring a second arm of the antenna to include a second spiral portion and a second rectilinear portion, the second spiral portion concentric with the first spiral portion; configuring an insulator to separate the first arm from the second arm; and disposing the insulator, the first arm, and the second arm as planar surfaces within a rectangular region.

In some cases, the method further comprises positioning the first rectilinear portion adjacent to a first side and a second side of a perimeter of the rectangular region and positioning the second rectilinear portion adjacent to a third side and a fourth side of the perimeter of the rectangular region. In some cases, the method further comprises coupling the first arm and the second arm to a ground plane through lumped port resistors configured to provide an impedance match between the antenna and a transmitter. In some such cases, the method further comprises disposing an insulating layer between the ground plane and the first and second arms. In some cases, the method further comprises fabricating the antenna as a printed circuit board.

Another example embodiment of the present disclosure provides an aircraft comprising: a transmitter; and an antenna mounted on a fuselage of the aircraft and coupled to the transmitter, wherein the antenna comprises: a first arm comprising a first spiral portion and a first rectilinear portion; a second arm comprising a second spiral portion and a second rectilinear portion, the second spiral portion concentric with the first spiral portion; and an insulator to separate the first arm from the second arm, wherein the insulator, the first arm, and the second arm are planar surfaces disposed within a rectangular region.

In some cases, the first rectilinear portion is adjacent to a first side and a second side of a perimeter of the rectangular region and the second rectilinear portion is adjacent to a third side and a fourth side of the perimeter of the rectangular region. In some cases, the antenna further comprises lumped port resistors configured to couple the first arm and the second arm to a ground plane, wherein the ground plane is the fuselage of the aircraft, the lumped port resistors configured to provide an impedance match between the antenna and the transmitter. In some such cases, the antenna further comprises an insulating layer disposed between the ground plane and the first and second arms. In some such cases, the antenna further comprises an antenna feed configured to couple the first and second arms to the transmitter, the antenna feed located in a channel penetrating through the insulating layer and the ground plane.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An antenna comprising:
   a first arm comprising a first spiral portion and a first rectilinear portion;
   a second arm comprising a second spiral portion and a second rectilinear portion, the second spiral portion concentric with the first spiral portion, such that the first and second spiral portions spiral adjacent to one another in a non-overlapping fashion;
   an insulator to separate the first arm from the second arm, wherein the insulator, the first arm, and the second arm are planar surfaces disposed within a rectangular region forming the bounds of the antenna; and
   wherein the first rectilinear portion is adjacent to a first side and a second side of a perimeter of the rectangular region and the second rectilinear portion is adjacent to a third side and a fourth side of the perimeter of the rectangular region.

2. The antenna of claim 1, wherein the antenna is mounted on a fuselage of an aircraft.

3. The antenna of claim 1, further comprising resistors configured to couple the first arm and the second arm to a ground plane.

4. The antenna of claim 3, wherein the ground plane is a fuselage of an aircraft.

5. The antenna of claim 3, further comprising an insulating layer disposed between the ground plane and the first and second arms.

6. The antenna of claim 5, further comprising an antenna feed configured to couple the first and second arms to a transmitter, the antenna feed located in a channel penetrating through the insulating layer and the ground plane.

7. The antenna of claim 6, wherein the resistors are configured to provide an impedance match between the antenna and the transmitter.

8. The antenna of claim 1, wherein the antenna is fabricated as a printed circuit board.

9. The antenna of claim 1, wherein the first arm and the second arm include copper.

* * * * *